(12) United States Patent
Ito (10) Patent No.: US 7,787,156 B2
(45) Date of Patent: Aug. 31, 2010

(54) FACSIMILE DEVICE

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1037 days.

(21) Appl. No.: 11/389,038

(22) Filed: Mar. 27, 2006

(65) Prior Publication Data

US 2006/0215229 A1    Sep. 28, 2006

(30) Foreign Application Priority Data

Mar. 25, 2005   (JP)   ............................. 2005-088259

(51) Int. Cl.
    *H04N 1/32*    (2006.01)
(52) U.S. Cl. .................. 358/442; 358/407; 358/411; 358/426.15; 358/468; 358/487; 379/100.01; 379/142.07
(58) Field of Classification Search ................ 358/441, 358/442, 407, 411, 426.15, 468, 487; 379/100.01, 379/142.07
    See application file for complete search history.

(56) References Cited

U.S. PATENT DOCUMENTS

| 5,809,132 A * | 9/1998 | Sakamoto | ................. 379/377 |
| 2005/0031098 A1 | 2/2005 | Ito | |

FOREIGN PATENT DOCUMENTS

| JP | H02-224866 A | 9/1990 |
| JP | H05-347695 A | 12/1993 |
| JP | H06-085989 | * 3/1994 |
| JP | H06-085989 A | 3/1994 |
| JP | H08-088749 | * 2/1996 |
| JP | H08-088749 A | 4/1996 |
| JP | H08-251280 A | 9/1996 |
| JP | H08-289125 A | 11/1996 |
| JP | 2004207809 | 7/2004 |
| JP | 2005-057659 A | 3/2005 |

OTHER PUBLICATIONS

Japanese Patent Office, Notification of Reasons of Rejection for Application No. 2005-088259, dated Jun. 24, 2008 (Counterpart to above-captioned patent application).

* cited by examiner

*Primary Examiner*—Melur Ramakrishnaiah
*Assistant Examiner*—Yosef K Laekemariam
(74) *Attorney, Agent, or Firm*—Baker Botts L.L.P.

(57) ABSTRACT

A facsimile device connected to a public line in parallel with an external telephone is provided. The facsimile device includes a facsimile circuit configured to send and receive image data through the public line, a voltage detector that detects a voltage of the public line, a telephone status monitoring unit configured to judge whether the external telephone closes the public line based on the voltage of the public line detected by the voltage detector and a reference voltage, a monitoring operation control unit configured to keep the telephone status monitoring unit in an inactive state until a predetermined time elapses from a time when the facsimile circuit releases the public line, and to activate the telephone status monitoring unit if the predetermined time elapses from the time when the facsimile circuit releases the public line.

6 Claims, 5 Drawing Sheets

FACSIMILE DEVICE

CROSS-REFERENCE TO RELATED APPLICATION

This application claims priority under 35 U.S.C. §119 from Japanese Patent Application No. 2005-088259, filed on Mar. 25, 2005. The entire subject matter of the application is incorporated herein by reference.

BACKGROUND

1. Technical Field

Aspects of the present invention relate to a facsimile device used in a situation in which the facsimile device is connected to a public line in parallel with a telephone, particularly to a facsimile device having a printing function and a scanning function.

2. Description of Related Art

A facsimile device is configured to communicate with an external device through the public line. Therefore, in general, a facsimile device is used in an office or a home in a situation where the facsimile device is connected to the public line in parallel with a telephone. From the viewpoint of such a use environment of facsimile devices, a facsimile device having the function of judging whether a telephone (i.e., whether the telephone is in an on-book state) closes the public line has been proposed.

An example of such a facsimile device is disclosed in Japanese Patent Provisional Publication No. 2004-207809 (hereafter, referred to as JP 2004-207809A). According to JP 2004-207809A, the facsimile device is configured to detect a voltage of the public line to which the facsimile device and a telephone (an external telephone) are connected. The facsimile device judges that the external telephone closes the public line (i.e., the external telephone is in an on-hook state) if the facsimile device releases the public line and the voltage of the public line is lower than or equal to a predetermined voltage, while the facsimile device judges that the external telephone releases the public line (i.e., the external telephone is in an off-hook state) if the facsimile device releases the public line and the voltage of the public line is higher than the predetermined voltage.

Figure 5:
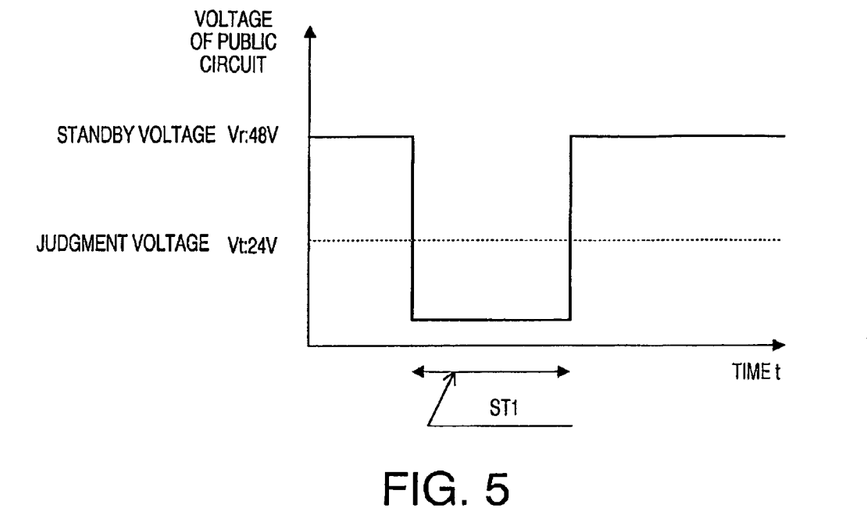
FIG. 5 is a graph illustrating change of a voltage of a public line in a situation where a digital service unit does not intervene between the public line and communication devices.

Meanwhile, there is a case where the facsimile device is not able to appropriately judge whether the external telephone releases the public line if a digital service unit such as a PBX (Private Branch Exchange) or a terminal adapter intervenes between the public line and communication devices (i.e., the facsimile device and the external telephone). FIG. 5 is a graph illustrating change of the voltage of the public line in a situation where a digital service unit does not intervene between the public line and the communication devices. As shown in FIG. 5, if the facsimile device or the external telephone transfer to a state where the facsimile device and the external telephone are capable of conducting data communications, the public line is closed and the voltage of the public line decreases from a standby voltage Vr to a certain low voltage. If the public line is released, the voltage of the public line recovers to the standby voltage Vr.

In this situation, the facsimile device is able to appropriately judge that the external telephone closes the public line (i.e., the external telephone is in an on-hook state) if the voltage of the public line is lower than a predetermined threshold Vt, while the facsimile device is appropriately judge that the external telephone releases the public line (i.e., the external telephone is in an off-hook state) if the voltage of the public line is higher than the predetermined threshold Vt.

Figure 6:
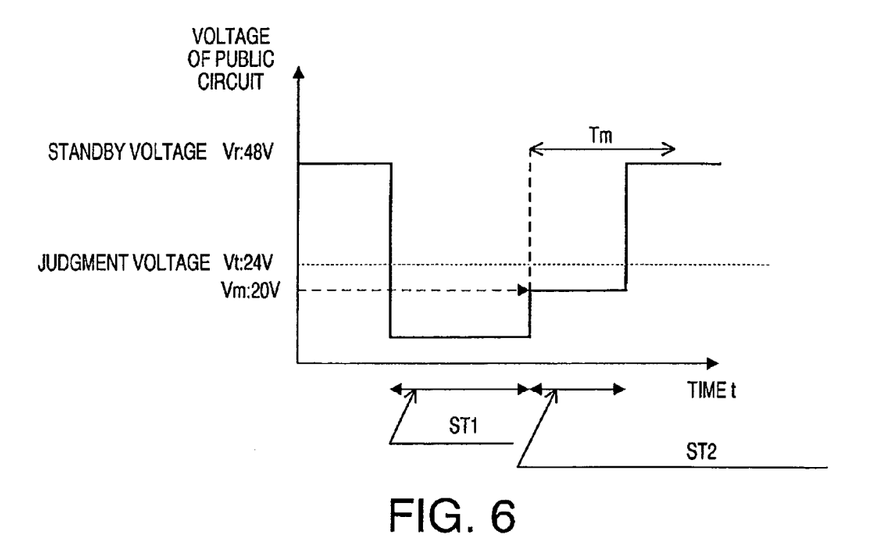
FIG. 6 illustrates change of a voltage of a public line in a situation where a digital service unit intervenes between the public line and communication devices.

On the other hand, if a digital service unit intervenes between the public line and the communication devices, the voltage of the public line may change as shown in FIG. 6. That is, FIG. 6 is a graph illustrating the case where the voltage of the public line does not recover quickly to the standby voltage Vr after the facsimile device releases the public line. In this case, the voltage of the public line does not recover to the standby voltage Vr until a predetermined time period has elapsed. That is, the voltage of the public line stays at an intermediate voltage, which is lower than the predetermined threshold Vt, until the predetermined time period has elapsed.

In this case, the facsimile device erroneously judges that the external telephone closes the public line even if the external telephone releases the public line because as described above the voltage of the public line is kept at the intermediate voltage lower than the predetermined threshold Vr in the predetermined time period. In this case, the facsimile device may erroneously display a message indicating that the external telephone is in a busy state despite the fact that the external telephone has already releases the public line.

SUMMARY

Aspects of the present invention are advantageous in that a facsimile device, capable of preventing an erroneous judgment that an external telephone closes a public line from occurring when the facsimile device releases the public line, is provided.

DETAILED DESCRIPTION

General Overview

According to an aspect of the invention, there is provided a facsimile device connected to a public line in parallel with an external telephone. The facsimile device includes a facsimile circuit configured to send and receive image data through the public line, a voltage detector that detects a voltage of the public line, a telephone status monitoring unit configured to judge whether the external telephone closes the public line based on the voltage of the public line detected by the voltage detector and a reference voltage, a monitoring operation control unit configured to keep the telephone status monitoring unit in an inactive state until a predetermined time elapses from a time when the facsimile circuit releases the public line, and to activate the telephone status monitoring unit if the predetermined time elapses from the time when the facsimile circuit releases the public line.

With this configuration, it becomes possible to prevent the facsimile device from judging erroneously that the external telephone releases the public line when the facsimile circuit of the facsimile device releases the public line because the operation of the telephone status monitoring unit is not effected by a digital service unit.

Optionally, the facsimile device may include a warning unit configured to output a warning indicating that the external telephone is in a busy state if the telephone status monitoring unit judges that the external telephone closes the public line.

According to another aspect of the invention, there is provided a facsimile device connected to a public line in parallel with an external telephone. The facsimile device includes a facsimile circuit configured to send and receive image data through the public line, a terminal to which the external telephone can be connected, the terminal connecting the external telephone to the public line in parallel with the facsimile circuit, a line switch unit configured to connect the public line to the terminal when operated by a manual operation, a judgment unit configured to judger whether a signal coming to the facsimile device through the public line is a sound signal or a facsimile signal, and a warning indication unit configured to output a warning message to operate the line switch unit if the judgment unit judges that the signal coming to the facsimile device through the public line is the sound signal. The facsimile device further includes a voltage detector that detects a voltage of the public line, a telephone status monitoring unit configured to judge whether the external telephone closes the public line based on the voltage of the public line detected by the voltage detector and a reference voltage, a warning unit configured to output a warning indicating that the external telephone is in a busy state if the telephone status monitoring unit judges that the external telephone closes the public line, a first monitoring operation control unit configured to keep the telephone status monitoring unit in an inactive state until a predetermined time elapses from a time when the facsimile circuit releases the public line, and to activate the telephone status monitoring unit if the predetermined time elapses from the time when the facsimile circuit releases the public line, and a second monitoring operation control unit configured to activate immediately the telephone status monitoring unit if the line switch unit is operated by the manual operation.

With this configuration, it becomes possible to prevent the facsimile device from judging erroneously that the external telephone releases the public line when the facsimile circuit of the facsimile device releases the public line because the operation of the telephone status monitoring unit is not effected by a digital service unit.

With regard to the above mentioned two aspects of the invention, the telephone status monitoring unit may judge whether the external telephone closes the public line in accordance with a voltage difference between the voltage of the public line detected by the voltage detector and the reference voltage.

Alternatively, the telephone status monitoring unit may judge that the external telephone closes the public line if the voltage of the public line detected by the voltage detector is lower than or equal to a predetermined voltage which is lower than the reference voltage.

Optionally, the reference voltage may be a standby voltage of the public line.

Still optionally, the facsimile device may include a time setting unit configured to adjust the predetermined time.

In an example, the predetermined time may be longer then or equal to 1.5 seconds.

Illustrative Embodiments

Hereafter, illustrative embodiments according to the invention will be described with reference to the accompanying drawings.

First Embodiment

Figure 1:
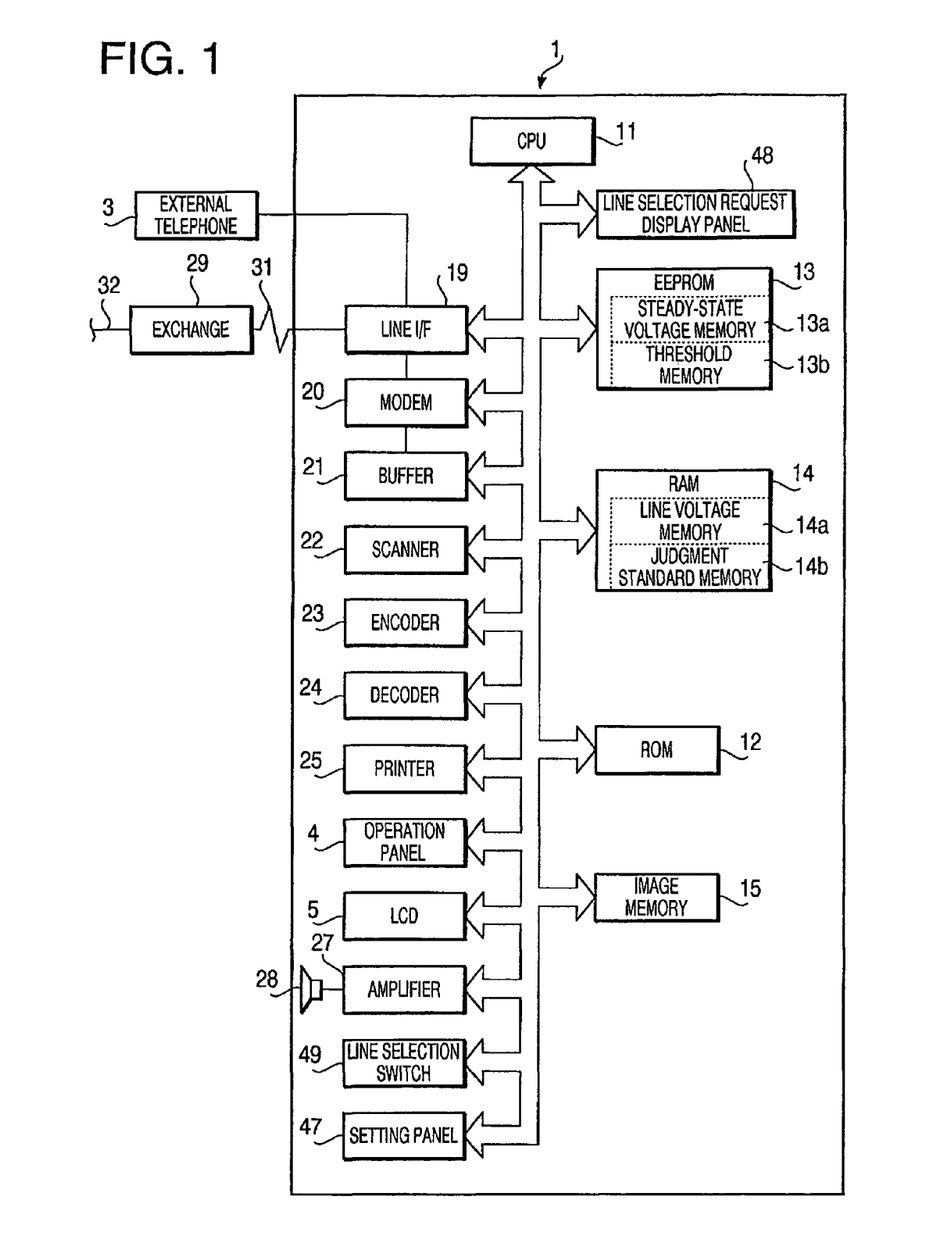
FIG. 1 is a block diagram of a facsimile device according to an embodiment of the invention.
Figure 2:
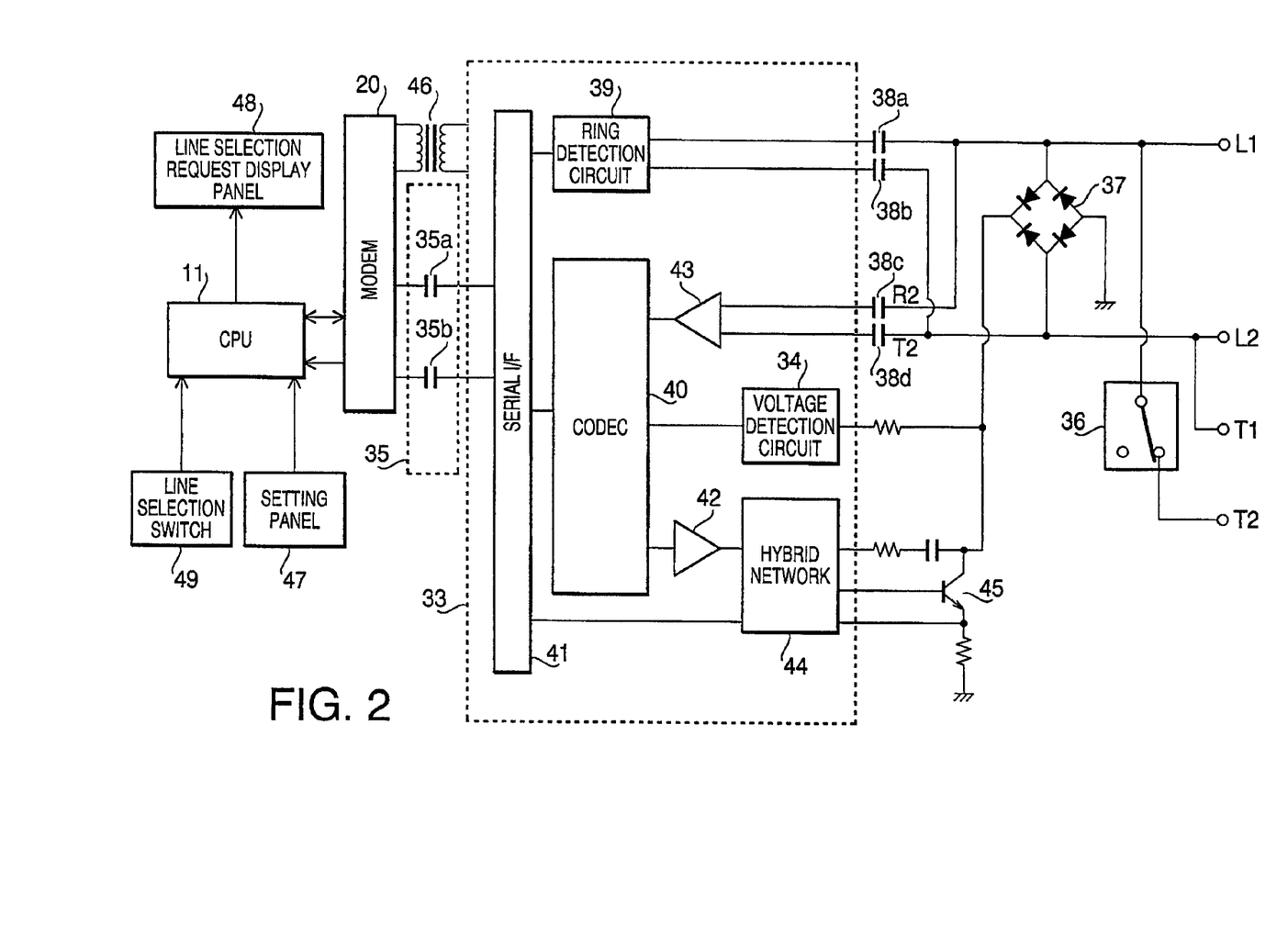
FIG. 2 is a circuit diagram of a line I/F (interface) unit of the facsimile device according to an embodiment of the invention.

FIG. 1 is a block diagram of a facsimile device 1 according to a first embodiment of the invention. FIG. 2 is a circuit diagram of a line I/F (interface) unit 19 of the facsimile device 1. As shown in FIG. 1, the facsimile device 1 includes a CPU 11, a ROM 12, an EEPROM 13, a RAM 14, an image memory 15, the line I/F 19, a modem 20, a buffer 21, a scanner 22, an encoding unit 23 and a decoding unit 24 (which form a facsimile circuit). The facsimile device 1 further includes a printer 25 (the printing function), an operation panel 4, an LCD (liquid crystal display) 5, and an amplifier 27. These components are connected to each other via a bus 30.

As shown in FIG. 1, an external telephone 3 and the facsimile device 1 are connected to the public line (i.e., public network) 32 in parallel via an exchange 29. That is, the exchange 29 intervenes between the public line 32 and communication devices (i.e. the facsimile device 1 and the external telephone 3).

On the LCD 5, various types of information are displayed according to instructions from the CPU 11. For example, a message indicating that the external telephone 3 is in a busy state, or a message indicating that the facsimile device 1 is in a data transmission mode is displayed on the LCD 5.

The line I/F 19 serves to control the line. The line I/F 19 may be attained by a DAA (Direct Access Arrangement) IC (integrated circuit) 33. As shown in FIG. 2, the line I/F 19 serves to receive various types of signals, including a call signal (a ring signal) and a signal conveying a phone number of the party on the other end (a caller number), from the exchange 29. The line I/F 19 further serves to send a dial signal in accordance with a user operation through the operation panel 4, to the exchange 29.

The line I/F 19 is provided with external terminals T1 and T2 which are used to connect the external telephone 3 to the public line 32 in parallel with the facsimile device 1.

The CPU 11 controls the internal components via the bus 30 in accordance with signals received via the line I/F 19 so that the facsimile function (i.e., data communication function of sending or receiving image signals) can be attained. In the ROM 12, various types of programs (including a program shown in FIG. 3) to be executed by the CPU 11 are stored. In the RAM 14, various types of data are stored temporarily during the execution of a program. The RAM 14 includes a line voltage memory 14a and a judgment standard memory 14b.

The line voltage memory 14a stores a voltage value to be supplied to the DAA IC 33 when a DC-circuit for controlling the public line is released in the DAA IC 33. In the line voltage memory 14a, voltage values detected by a voltage detection circuit 34 when the public line 31 is released are stored successively in the order in which the voltages are detected.

The line voltage memory 14a is capable of storing more than one voltage values (e.g., ten voltage values). If more than one voltage values are stored in the line voltage memory 14a, an average of the voltage values is calculated and then the voltage values are removed form the line voltage memory 14*a*. The average is stored in a steady-state voltage memory 13*a* as a standby voltage Vr in a steady-state.

The judgment standard memory 14*b* stores a judgment voltage Vt used as a criterion for judging whether the external telephone 3 is in an off-hook (hook up) state or in an on-hook (hook down) state. As shown in FIGS. 5 and 6, the judgment voltage Vt is lower than a reference voltage corresponding to a state in which the public line 31 is released, and a difference between the judgment voltage Vt and the reference voltage is larger than or equal to a certain voltage difference ΔV. In this embodiment, the standby voltage Vr is used as the reference voltage.

The EEPROM 13 includes the steady state voltage memory 13*a* and a threshold value memory 13*b*. The EEPROM 13 is able to hold data after the facsimile device 1 is turned to OFF.

In the steady-state memory 13*a*, the standby voltage Vr is stored. Data of the steady-state memory 13*a* is updated by an average of ten voltage values when ten voltage values are stored in the line voltage memory 14*a*. That is, the steady-state memory 13*a* is updated periodically while the public line 31 is in a released state.

In the threshold value memory 13*b*, a factor Ct (e.g., 0.5) and a released line voltage Vm, which are used to calculate the judgment voltage Vt for judging whether the external telephone 3 is in the off-hook state, are stored. In this embodiment, the judgment voltage Vt is calculated by multiplying the standby voltage Vr stored in the steady-state voltage memory 13*a* by the factor Ct stored in the threshold value memory 13*b*, and then the judgment voltage Vt is stored in the judgment standard memory 14*b*. The facsimile device 1 may be configured such that a user is able to modify the value of the factor Ct through the operation panel 4.

The image memory 15 is used to store a bit image of a communication history, image data or print data. The image memory 15 is, for example, a DRAM. Image data received by the facsimile device 1 is stored in the image memory 15 first, and an image represented by the image data is printed on a sheet by the printer 25. Subsequently, the image data is removed from the image memory 15. Image data corresponding to an image read by the scanner 22 is also stored in the image memory 15.

The modem 20 has the function of communicating with another device in accordance with a certain communication protocol while modulating and demodulating communication data, such as image data. The buffer 21 temporarily stores the communication data, such as encoded data, being exchanged between the facsimile device and another device.

The scanner 22 reads images from an original inserted into an original insertion opening (not shown) of the scanner 22. The scanner 22 is provided with a carrying motor for carrying an original (not shown). The encoding unit 23 encodes image data of an image read by the scanner 22. The decoding unit 24 reads image data from the buffer 21 or the image memory 15, and decodes the image data. An image represented by the decoded data is printed on a sheet by the printer 25. The amplifier 27 amplifies a sound signal to output sound (e.g., ringing tone or voice) through the speaker 28.

The printer 25 may be an inkjet printer including a sheet carrying motor, and a carriage motor for driving a carriage on which a print head is mounted.

The facsimile device 1 configured as above is connected to the public line 31 via the line I/F 19. The public line 31 connects the facsimile device 1 to the exchange 29, and the exchange 29 is connected to the public line 32.

As shown in FIG. 2, the DAA IC 33 has the functions as a circuit termination, a hybrid network, and a ring signal detector. An isolator 35 intervenes between the DAA IC 33 and the modem 20. The isolator 35 provides electrical isolation between the modem 20 and the DAA IC 33 in regard to a DC current, while the isolator 35 allows data and signals to pass through. The line I/F 19 further includes a CML (Connect MODEM to Line) relay 36 used to switch between voice communication and image communication, a rectifier 37, and DC loop cut capacitors 38*a*, 38*b*, 38*c* and 39*d*. The terminals L1 and L2 are connected to the public line 31. To the terminals T1 and T2, the external telephone 3 can be connected.

A codec 40 provided in the DAA IC 33 has the functions as an AC-DC converter and a DC-AC converter for facsimile data. In this configuration, the isolator 35 allows digital signals to pass through, and capacitors 35*a* and 35*b* provide high insulation performance.

In a standby mode, the CML relay 36 is set for a state where a line is closed for the external telephone 3 as shown in FIG. 2. In a facsimile communication mode, the CPU 11 operates to release the public line 32 from the external telephone 3 by changing a CML relay control signal to an OFF state.

The rectifier 37 rectifies a DC loop current of the public line to change the DC loop current to a current flowing only in a predetermined direction. Power supply voltage for the DAA IC 33 is supplied from the modem 20 side via a transformer 46, and the power supply voltage is rectified by the rectifier 37 so that the power supply voltage stays in a constant polarity regardless of voltage polarities of the public line 31. The voltage detection circuit 34 detects the voltage which has been rectified by the rectifier 37 and has been supplied to the DAA IC 33. As shown in FIG. 2, the voltage detection circuit 34 is connected to the codec 40 and a connection line connecting the rectifier 37 with the hybrid network 44. The detection result of the voltage detection circuit 34 is sent to the CPU 11 via the DAA IC 33 and the modem 20.

The hybrid network 44 has the functions of releasing and closing the public line. The hybrid network 44 includes a two-wire-to-four-wire conversion circuit for separating transmission data or reception data for facsimile data, a canceller for preventing transmission data from returning back along a reception path, and a filer circuit. The hybrid network 44 is connected to the public line, the codec 40, a serial I/F (interface) 41 and a ground line. A transmission amplifier 42 intervenes between the codec 40 and the hybrid network 44.

The codec 40 has the functions of the DC-AC conversion and the AC-DC conversion for facsimile transmission data and facsimile reception data. The public line, the external telephone 3, the hybrid network 44 and the serial I/F 41 are connected to the codec 40 via the transmission amplifier 42 or a tone amplifier 43. The transmission amplifier 42 is used to conduct the gain adjustment for the transmission data. The tone amplifier 43 is a differential amplifier having differential inputs respectively connected to the terminals L1 and L2 for the public line 31.

When a tone signal arrives at the line I/F 19 from the public line 31 or the external telephone 3, the tone signal passes through the tone amplifier 43, the codec 40, the serial I/F 41, the isolator 35, and the modem 20 in this order. Then, a tone detection signal is supplied from the codec 40 to the CPU 11.

A ring detection circuit 39 is connected to the public line, the external telephone 3 and the serial I/F 41. When a ring signal arrives at the line I/F 19 from the public line 31, a ring detection signal having the same cycle as the ring signal passes through the ring detection circuit 39, the serial I/F 41, a capacitor 35*a* of the isolator 35 in this order. Then, the Low to High transition or High to Low transition of the ring detection signal is detected by the CPU 11.

The DAA IC 33 has the function of adjusting impedance thereof by controlling a base level of a transistor 45 so that a voltage of the public line in a closed state to be detected by the voltage detection circuit 34 has a predetermined voltage-current property. The serial I/F 41 serves to combine signals such as a ring detection signal from the ring detection circuit 39 and facsimile reception data from the codec 40 into serial data to be outputted through the capacitor 35a of the isolator 35, and to separate control signals for causing the DAA IC 33 to release or close the public line 31 and facsimile transmission data for the codec 40 from a serial signal inputted thereto via the capacitor 35b of the isolator 35.

A setting panel 47 is used to adjust a monitoring stop time Tm, which is explained later. The setting panel 47 is provided on a rear side of a housing of the facsimile device 1 so as to keep a user from easily touching the setting panel 47. The monitoring stop time Tm is stored in the EEPROM 13. In this embodiment, 2 seconds is assigned to the monitoring stop time Tm as an initial value.

A line selection request display panel 48 serves to display a warning message urging a user to operate a line selection switch 49. As described later, such a warning message is displayed if a signal transmitted through the public line 32 is judged to be a sound signal by the facsimile device 1. The line selection switch 49 serves to switch an operation mode of the facsimile device 1 between a voice communication mode (TEL mode) and a facsimile mode. The line selection switch 49 may be configured as a manual switch to be operated by a user. The line selection request display panel 46 and the line selection switch 49 are located at a position adjacent to the operation panel 4 so that a user can easily notice the position of the line selection request display panel 46 and the line selection switch 49.

Figure 3:
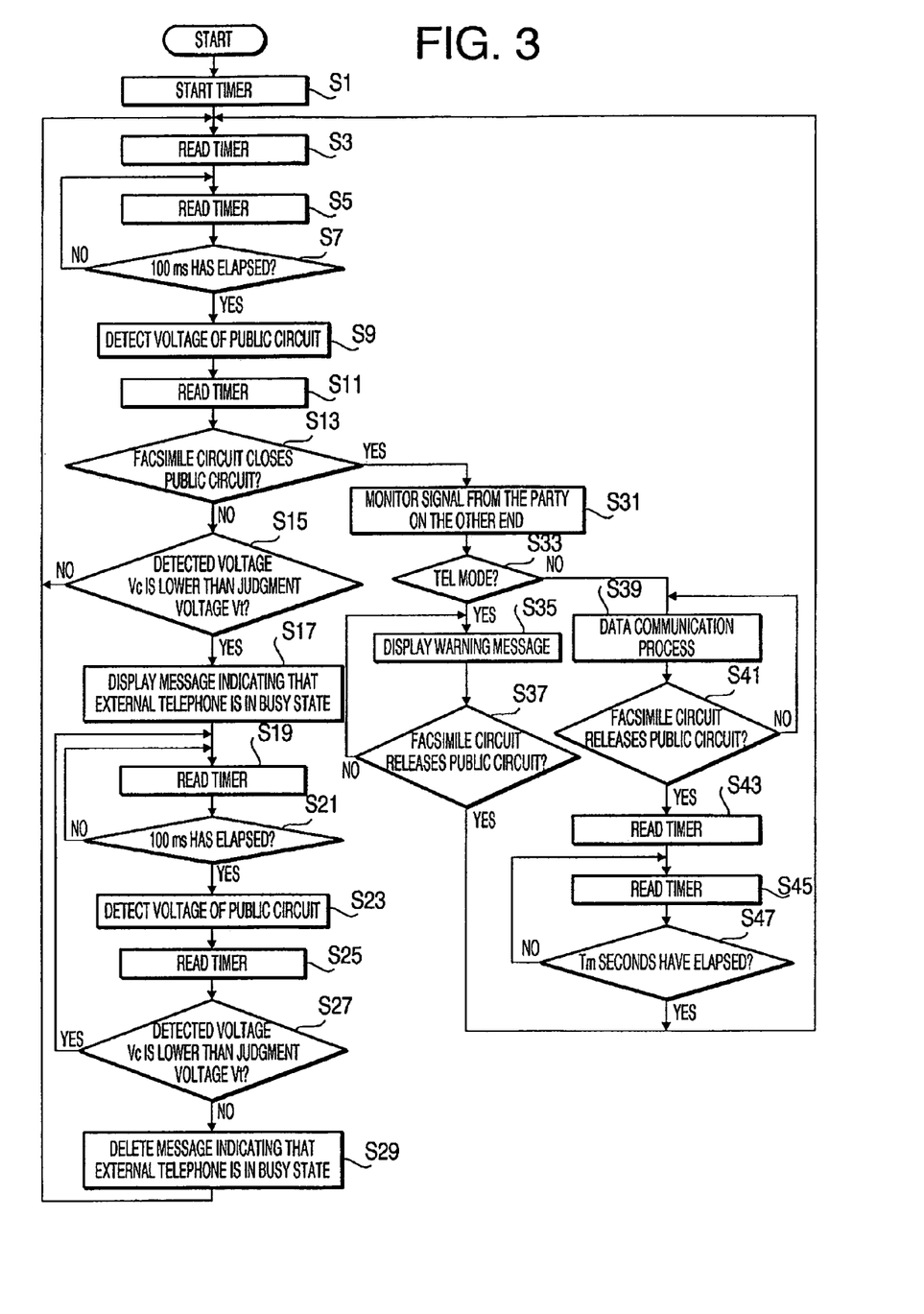
FIG. 3 is a flowchart illustrating a control process for detecting whether an external telephone is in an on-hook state or an off-hook state in accordance with a first embodiment of the invention.

Hereafter, a control process for detecting a state of the external telephone 3 to be executed under control of the CPU 11 of the facsimile device 1 will be explained with reference to FIG. 3. By the control process, whether the external telephone 3 is in an on-hook state or an off-hook state is detected.

First, an internal timer is activated (step S1). Then, a current time indicated by the internal timer is read from the internal timer, and the current time is stored in the RAM 14 (step S3). In steps S3 to S9, the CPU 11 detects a voltage of the public line 32 at predetermined time intervals (100 ms intervals in this embodiment). Specifically, the CPU 11 reads a current time from the internal timer activated in step S1 (step S5), and compares the current time with the time stored in the RAM so as to judge whether a predetermined time has elapsed from a time when the voltage of the public line 32 is previously detected (step S7).

If the predetermined time has not elapsed from the time of the previous detection of the voltage of the public line (S7: NO), steps S5 and S7 are repeated. If the predetermined time has elapsed from the time of the previous detection of the voltage of the public line (S7: YES), control proceeds to step S9 where the voltage of the public line 32 is detected by the voltage detection circuit 34. Then, a current time is read from the internal timer and is stored in the RAM (S111). Hereafter, the voltage of the public line detected by the voltage detection unit 34 is referred to as a detected line voltage Vc.

Next, in step S13, the CPU 11 judges whether the facsimile circuit (i.e., the DAA IC 33) closes the public line 32 (i.e., whether the facsimile device 1 is in facsimile data communication). More specifically, the CPU 11 makes a judgment in step S113 by judging whether the CPU 11 issues a command signal for conducting transmission and reception of facsimile data. It should be noted that the judgment in step 513 is not conducted by judging whether a voltage difference between the standby voltage Vr and the detected line voltage Vc becomes larger than a predetermined voltage difference ΔV (i.e., whether the detected line voltage Vc decreases by a certain voltage with respect to the judgment voltage Vt).

If the facsimile circuit releases the public line 32 (i.e., the facsimile device 1 is not in facsimile data communication (step S13: NO), control proceeds to step S15 where the CPU 11 judges whether the external telephone 3 releases the public line 32 (i.e., the CPU 11 judges whether the detected line voltage Vc is lower than the judgment voltage Vt).

If the detected line voltage Vc is higher than or equal to the judgment voltage Vt (S15: NO), the CPU 11 judges that the external telephone 3 releases the public line 32. In this case, control returns to step S3 and the voltage of the public line is detected again at the predetermined time intervals. If the detected line voltage Vc is lower than the judgment voltage Vt (S15: YES), the CPU 11 judges that the external telephone 3 closes the public line 32. In this case, a warning message indicating that the external telephone is in a busy state is displayed on the LCD 5 (step S17).

It is considered that the external telephone 3 is using the public line 32 if the detected line voltage Vc is lower than the judgment voltage Vt. In this case, the facsimile device 1 is not able to use the public line 32 concurrently with the external telephone 3. Therefore, in this case, the CPU 11 displays the warning message ("the external telephone is in a busy state") on the LCD 5, and executes steps from step S19 so as to continue monitoring the external telephone 3.

That is, in steps S19 to S25, the voltage of the public line 32 is repeatedly detected in the predetermined time intervals (e.g., time intervals of 100 ms) as in the case of the steps S5 to S11.

Next, in step S27, the CPU 11 judges whether the detected line voltage Vc is lower than the judgment voltage Vt. If the detected line voltage Vc is lower than the judgment voltage Vt (S27: YES), the CPU 11 judges that the public line 32 is closed by the external telephone 3, and therefore control returns to step S19 to repeatedly detect the voltage of the public line 32 again (S19 to S25).

If the detected line voltage Vc is higher than or equal to the judgment voltage Vt (S27: NO), the CPU 11 judges that the public line 32 is released by the external telephone 3 and therefore control proceeds to step S29 where the warning message indicating that external telephone is in a busy state displayed on the LCD 5 is removed. Then, control returns to step S3 to repeatedly detect the voltage of the public line 32 again (S3 to S11).

If it is judged in step S13 that the facsimile circuit (the DA IC 33) closes the public line 32 (S13: YES), control proceeds to step S31 where a signal arriving from the public line 32 is monitored. Then, the CPU 11 judges whether the signal is a sound signal (TEL mode) or a facsimile signal (facsimile mode) (S37).

If the signal is judged to be a sound signal (TEL mode) (S33: YES), a warning message urging a user to operate the line selection switch 49 is displayed on the line selection request display panel 48 (S35). Then, the CPU 11 judges whether the facsimile circuit releases the public line 32 (S37). The warning message urging a user to operate the line selection switch 49 remains on the line selection request display panel 48 until the facsimile device 1 releases the public line 32 and the public line 32 is connected to the external telephone 3 (S37: NO).

If a user operates the line selection switch 4 and the external telephone 3 is connected to the public line 32 after the public line 32 is released (S37: YES), control returns to step S3 so as to repeatedly detect the voltage of the public line again at the predetermined time intervals (S3 to S11). In this case, the judgment result of step S13 becomes "NO" because the facsimile circuit does not close the public line if control returns from step S13 in which the facsimile circuit releases the public line 32 and the external telephone 3 is connected to the public line 32. In this case, the CPU 11 judges whether the external telephone 3 closes the public line 32 in step S15.

If the warning message urging a user to operate the line selection switch 49 is displayed on the line selection request display panel 48 and thereby the public line 32 is connected to the external telephone 3 by a user operation (S37: YES), the CPU 11 immediately judges whether the external telephone 3 closes the public line 32 because a time period for steps S3 to S11 is very short (100 ms).

If it is judged in step S33 that the signal is not a sound signal (i.e., the facsimile device is in a facsimile mode) (S33: NO), facsimile data communication is conducted (S39). Then, the CPU 11 judges whether the facsimile circuit releases the public line 32 (i.e., whether the facsimile data communication is finished) (S41). If the facsimile data communication is finished (S41: YES), a current time is read from the internal timer activated in step S1 and is stored in the RAM 14 (S43). Then, a time of the internal timer is read from the internal timer (S45). Next, in step S47, the CPU 11 compares the current time obtained in step S45 with the time stored in the RAM 14 so as to judge whether a monitoring stop time Tm has elapsed from a time when the facsimile circuit 1 releases the public line 32.

The monitoring stop time Tm is set to be longer than or equal to a time during which an intermediate voltage Vm shown in FIG. 6 is maintained in the case where a digital service unit is located between the public line and communication devices (i.e., the facsimile device 1 and the external telephone 3). In general, the intermediate voltage Vm is maintained for approximately 1.5 seconds. Therefore, the monitoring stop time Tm is set to, for example, 2 seconds, considering individual differences of digital service units. It is understood that the monitoring stop time Tm may be set for a time longer than or equal to 1.5 seconds.

If the monitoring stop time Tm has elapsed from the time when the facsimile circuit 1 releases the public line 32 (S47: YES), control returns to step S3 so as to repeatedly detect the voltage of the public line at the predetermined time intervals (S3 to S11).

As described above, in the facsimile mode, the judgment as to whether the external telephone 3 closes the public line 32 is not conducted until the monitoring stop time Tm elapses. Such judgment is conducted only after the monitoring stop time Tm has elapsed.

As described above, the problem that a conventional facsimile device erroneously judges that an external telephone closes the public line despite the fact that the external telephone releases the public line is ascribable to the fact that the voltage of the public line is maintained at an intermediate level lower than the judgment voltage Vt for a certain time by a digital service unit.

By contrast, according to the embodiment, the CPU 11 does not judge whether the external telephone 3 releases the public line 32 until a certain time has elapsed from the time when the facsimile circuit releases the public line 32. The CPU 11 judges whether the external telephone 3 releases the public line 32 only after the monitoring stop time Tm has elapsed from the time when the facsimile circuit releases the public line 32. Such a configuration enables the CPU 11 to appropriately judge whether the external telephone 3 releases the public line 32 without being effected by the digital service unit.

That is, it is possible to prevent the facsimile device 1 from judging erroneously that the external telephone 3 closes the public line 32 when the facsimile circuit of the facsimile device 1 releases the public line 32.

In the above mentioned embodiment, the facsimile device 1 is provided with the terminals L1 and L2 through which the external telephone 3 is connected to the facsimile device 1. Therefore, the facsimile device 1 is able to receive a signal transmitted from the public line 32 and to judge whether the signal is a sound signal or a facsimile signal. Further, the facsimile device 1 is able to display a warning message urging a user to operate the line selection switch 49.

In this case, the operation to the line selection switch 49 conducted by the user apparently corresponds to the closing of the public line 32 by the external telephone 3. In the case where the operation to the line selection switch 49 is conducted by the user, if the CPU 11 does not make a judgment as to whether the external telephone 3 closes the public line 32 until the monitoring stop time Tm has elapsed, the CPU 11 becomes unable to display a message indicating that the external telephone 3 is in a busy state even if the external telephone 3 has apparently closed the public line 32. In such a case, a user may misunderstand that the facsimile device 1 is out of order.

By contrast, according to the embodiment, if a user operates the line selection switch 49, the CPU 11 immediately judges whether the external telephone 3 releases the public line 32. Therefore, it becomes possible to prevent the CPU 11 from becoming unable to display a message indicating that the external telephone 3 is in a busy state even if the external telephone 3 has apparently closed the public line 32. It is also possible to prevent a user from misunderstanding that the facsimile device 1 is out of order.

In the above mentioned embodiment, the facsimile device 1 is provided with the setting panel 47 allowing a user to adjust the monitoring stop time Tm. Such a configuration enables the facsimile device 1 to support various lengths for the monitoring stop time Tm even if a property of the intermediate voltage Vm varies by a relatively large amount among digital service units. Such a configuration enables the facsimile device 1 to judge whether the external telephone closes the public line 32 more reliably.

Second Embodiment

Hereafter, a second embodiment regarding a control process executed by the facsimile device I will be described. Since the feature of the second embodiment is a control process for detecting whether the external telephone 3 is in an off-hook state or in an on-hook state, only the feature of the second embodiment will be described with reference to FIG. 4.

Figure 4:
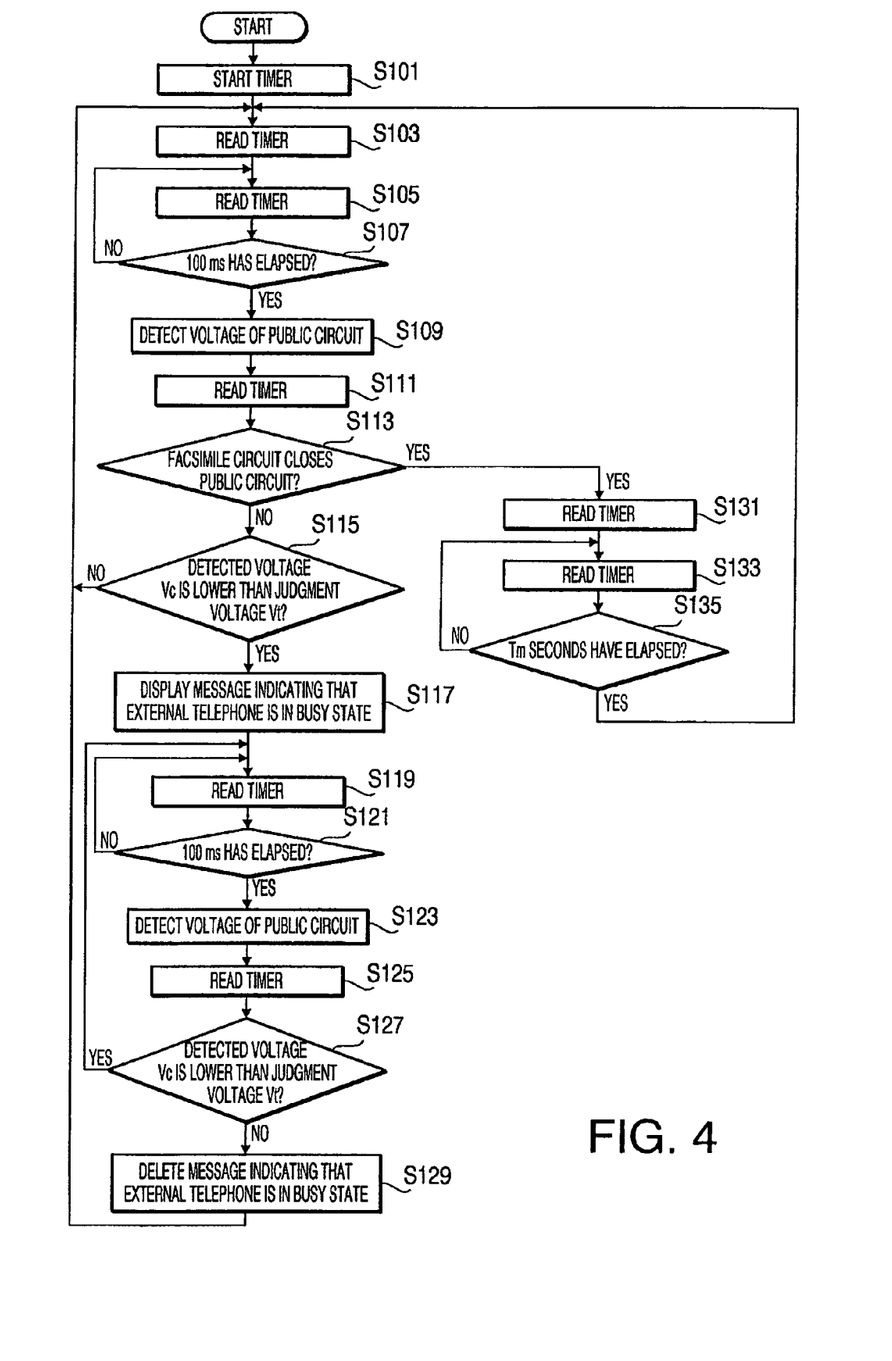
FIG. 4 is a flowchart illustrating a control process for detecting whether an external telephone is in an on-hook state or an off-hook state in accordance with a second embodiment of the invention.

When the control process shown in FIG. 4 is initiated, an internal timer is activated in step S101. Then, a current time is read from the internal timer, and is stored in the RAM 14 (step S103). In steps S103 to S109, the CPU 11 detects a voltage of the public line 32 at predetermined time intervals (100 ms intervals in this embodiment). Specifically, the CPU 11 reads a current time from the internal timer activated in step S101 (step S105), and compares the current time with the time stored in the RAM 14 so as to judge whether a predetermined time has elapsed from a time when the voltage of the public line 32 is previously detected (step S107).

If the predetermined time has not elapsed from the time of the previous detection of the voltage of the public line (S107: NO), steps S105 and 5107 are repeated. If the predetermined time has elapsed from the time of the previous detection of the voltage of the public line (S107: YES), control proceeds to step S109 where the voltage of the public line 32 is detected by the voltage detection circuit 34. Then, a current time is read from the internal timer and is stored in the RAM 14 (S111).

Next, in step S113, the CPU 11 judges whether the facsimile circuit (i.e., the DAA IC 33) closes the public line 32. If the facsimile circuit releases the public line 32 (i.e., the facsimile device 1 is not in facsimile data communication (step S113: NO), control proceeds to step S115 where the CPU 11 judges whether the external telephone 3 releases the public line 32 (i.e., the CPU 11 judges whether the detected line voltage Vc is lower than the judgment voltage Vt).

If the detected line voltage Vc is higher than or equal to the judgment voltage Vt (S1115: NO), the CPU 11 judges that the external telephone 3 releases the public line 32. In this case, control returns to step S3 and the voltage of the public line is detected again at the predetermined time intervals. If the detected line voltage Vc is lower than the judgment voltage Vt (S115: YES), the CPU 11 judges that the external telephone 3 closes the public line 32. In this case, a warning message indicating that the external telephone is in a busy state is displayed on the LCD 5 (step S117).

After the warning message indicating that the external telephone is in a busy state is displayed on the LCD 5, the voltage of the public line 32 is repeatedly detected as in the case of steps S105 to S111 (S119 to S125).

Next, in step S127, the CPU 11 judges whether the detected line voltage Vc is lower than the judgment voltage Vt. If the detected line voltage Vc is lower than the judgment voltage Vt (S127: YES), the CPU 11 judges that the public line 32 is closed by the external telephone, and therefore control returns to step S129 to repeatedly detect the voltage of the public line 32 again (S119 to S125).

If the detected line voltage Vc is higher than or equal to the judgment voltage Vt (S127: NO), the CPU 11 judges that the public line 32 is released by the external telephone 3 and therefore control proceeds to step S129 where the warning message indicating that external telephone is in a busy state displayed on the LCD 5 is deleted. Then, control returns to step S103 to repeatedly detect the voltage of the public line 32 again (S103 to S111).

If it is judged in step S113 that the facsimile circuit (the DAA IC 33) closes the public line 32 (S113: YES), the public line 32 is closed or released by the external telephone 3. In this embodiment, if the CPU 11 judges that the facsimile circuit closes the public line 32, the CPU 11 makes a judgment on whether the external telephone 3 closes the public line 32 after the monitoring stop time Tm has elapsed.

Specifically, if the facsimile circuit (the DAA IC 33) closes the public line 32 (S113: YES), the CPU 11 reads a current time from the internal timer, and is stored in the RAM 14 (S131). Next, in step S133, a current time is read from the internal timer and is compared with the time stored in the RAM 14 so as to judge whether the monitoring stop time Tm has elapsed from the time when the facsimile circuit releases the public line 32 (S135). A value of the monitoring stop time Tm may be the same value as that of the first embodiment.

If it is judged that the monitoring stop time Tm has elapsed from the time when the facsimile circuit releases the public line 32 (S135: YES), control returns to step S103 to repeatedly detect the voltage of the public line at the predetermined time intervals (S103 to S111).

According to the second embodiment, the same advantages as those of the first embodiment can be attained. As described above, the CPU 11 does not judge whether the external telephone 3 releases the public line 32 until a certain time has elapsed from the time when the facsimile circuit releases the public line 32. The CPU 11 judges whether the external telephone 3 releases the public line 32 only after the monitoring stop time Tm has elapsed from the time when the facsimile circuit releases the public line 32. Such a configuration enables the CPU 11 to appropriately judge whether the external telephone 3 releases the public line 32 without being effected by the digital service unit.

That is, it is possible to prevent the facsimile device 1 from judging erroneously that the external telephone 3 closes the public line 32 when the facsimile circuit of the facsimile device 1 releases the public line 32.

Although the present invention has been described in considerable detail with reference to certain preferred embodiments thereof, other embodiments are possible.

In the above mentioned embodiments, the judgment on whether the facsimile circuit 32 closes the public line 32 is made by judging whether the CPU 11 issues a command for transmitting or receiving facsimile data. However, such a judgment may be made by judging whether a voltage difference between the detected line voltage Vc and the standby voltage Vr is larger than a predetermined voltage difference ΔV (i.e., whether the detected line voltage Vc is lower than the judgment voltage Vt).

In the above mentioned embodiments, the facsimile device 1 is provided with the terminals T1 and T2 through which the external telephone 3 is connected to the facsimile device 1. However, the connection between the facsimile device 1 and the external telephone 3 may be attained by another electric component such as an external divider.

The facsimile device 1 and the external telephone 3 may be integrated into a single device. In this case, a facsimile device having a telephone function may be configured to have a handset in which a speaker for outputting transmitted sound and a microphone for picking up voice of a caller are mounted.

What is claimed is:

1. A facsimile device connected to a public line in parallel with an external telephone, comprising:
  a facsimile circuit configured to send and receive image data through the public line;
  a terminal to which the external telephone can be connected, the terminal connecting the external telephone to the public line in parallel with the facsimile circuit;
  a line switch unit configured to connect the public line to the terminal when operated by a manual operation;
  a judgment unit configured to judger whether a signal coming to the facsimile device through the public line is a sound signal or a facsimile signal;
  a warning indication unit configured to output a warning message to operate the line switch unit if the judgment unit judges that the signal coming to the facsimile device through the public line is the sound signal;
  a voltage detector that detects a voltage of the public line;
  a telephone status monitoring unit configured to judge whether the external telephone closes the public line based on the voltage of the public line detected by the voltage detector and a reference voltage;
  a warning unit configured to output a warning indicating that the external telephone is in a busy state if the telephone status monitoring unit judges that the external telephone closes the public line; and
  a first monitoring operation control unit configured to keep the telephone status monitoring unit in an inactive state until a predetermined time elapses from a time when the facsimile circuit releases the public line, and to activate the telephone status monitoring unit if the predetermined time elapses from the time when the facsimile circuit releases the public line, wherein only when the line switch unit is operated by the manual operation, the first monitoring operation control unit activates the telephone status monitoring unit even if the predetermined time does not elapse from the time when the facsimile circuit releases the public line.

2. The facsimile device according to claim 1, wherein the telephone status monitoring unit judges whether the external telephone closes the public line in accordance with a voltage difference between the voltage of the public line detected by the voltage detector and the reference voltage.

3. The facsimile device according to claim 1, wherein the telephone status monitoring unit judges that the external telephone closes the public line if the voltage of the public line detected by the voltage detector is lower than or equal to a predetermined voltage which is lower than the reference voltage.

4. The facsimile device according to claim 1, wherein the reference voltage is a standby voltage of the public line.

5. The facsimile device according to claim 1, further comprising a time setting unit configured to adjust the predetermined time.

6. The facsimile device according to claim 1, wherein the predetermined time is longer then or equal to 1.5 seconds.

* * * * *